United States Patent
Sayama

(10) Patent No.: US 7,552,339 B2
(45) Date of Patent: Jun. 23, 2009

(54) IMAGE TRANSMISSION DEVICE, OPERATIONS MANAGEMENT METHOD, AND COMPUTER-READABLE MEDIUM HAVING OPERATIONS MANAGEMENT PROGRAM EMBODIED THEREIN

(75) Inventor: Katsumi Sayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 855 days.

(21) Appl. No.: 11/109,631

(22) Filed: Apr. 20, 2005

(65) Prior Publication Data

US 2005/0264831 A1 Dec. 1, 2005

(30) Foreign Application Priority Data

Apr. 22, 2004 (JP) .............................. 2004-126786

(51) Int. Cl.
*H04L 9/00* (2006.01)
(52) U.S. Cl. .................... 713/186; 713/185; 713/168
(58) Field of Classification Search ................. 713/168, 713/185, 186
See application file for complete search history.

(56) References Cited

U.S. PATENT DOCUMENTS 6,656,119 B2 12/2003 Sasaki et al.

FOREIGN PATENT DOCUMENTS

| JP | 7-306730 | 11/1995 |
|---|---|---|
| JP | 8-161547 | 6/1996 |
| JP | 2000-276018 | 10/2000 |
| JP | 2000-316064 | 11/2000 |
| JP | 2001-344349 | 12/2001 |
| JP | 2004-5408 | 1/2004 |

OTHER PUBLICATIONS

Li et al., Design of a role based trust management framework, year 2002.*
Low cost image transmission system Skogmo, D.;Security Technology, 1994. Proceedings. Institute of Electrical and Electronics Engineers 28th Annual 1994 International Carnahan Conference on Oct. 12-14, 1994 pp. 80-85.*
Image transmissions with security enhancement based on region and path diversity in wireless sensor networks Wang, Honggang; Peng, Dongming; Wang, Wei; Sharif, Hamid; Chen, Hsiao-Hwa; Wireless Communications, IEEE Transactions on vol. 8, Issue 2, Feb. 2009 pp. 757-765.*
Group 3 error-free facimile terminal for analog cellular networks Kawabe, M.; Kato, T.; Sato, T.; Bessho, M.; Fukasawa, A.; Vehicular Technology, IEEE Transactions on vol. 45, Issue 1, Feb. 1996 pp. 64-73.*

* cited by examiner

*Primary Examiner*—David Y Jung
(74) *Attorney, Agent, or Firm*—Oblon, Spivak, McClelland, Maier & Neustadt, P.C.

(57) ABSTRACT

An image transmission device is disclosed. When a device user starts to use the device or logs in, authentication is done. If the device user is identified as a customer engineer, the system control part displays operations not permitted to be performed by the customer engineer in a manner different from permitted operations on an operations display part. For instance, the non-permitted operations are displayed at half brightness. The permitted operations may be specified in advance by a user registered as a manager.

15 Claims, 16 Drawing Sheets

| ID | PASSWORD | RIGHT |
|---|---|---|
| mag 1 | ***** | MANAGER |
| guest 1 | ***** | GUEST USER |
| CE 1 | ***** | CUSTOMER ENGINEER |
| ⋮ | ⋮ | ⋮ |

13a

NORMAL DISPLAY SCREEN

FAX NO. DIRECTLY INPUT FROM NUMERIC KEYPAD

DESTINATION LIST

DISPLAY SCREEN FOR CUSTOMER ENGINEER

FAX NO. DIRECTLY INPUT FROM NUMERIC KEYPAD

FIG.16

| TIME | LOGIN ID | OPERATION | DISPLAY ITEM | TRANSMISSION DATA |
|---|---|---|---|---|
| 2004/03/01/13:45 | CE 1 | TRANSMISSION | TRANSMISSION BASIC MENU ONLY | data 1 |
| 2004/03/01/13:52 | CE 1 | TRANSMISSION | TRANSMISSION BASIC MENU ONLY | TEST DATA |
| ... | ... | ... | ... | ... |

13c

IMAGE TRANSMISSION DEVICE, OPERATIONS MANAGEMENT METHOD, AND COMPUTER-READABLE MEDIUM HAVING OPERATIONS MANAGEMENT PROGRAM EMBODIED THEREIN

BACKGROUND OF THE INVENTION

1. Field of the Invention

The present invention relates to an image transmission device that authenticates a user, an operations management method, and a computer-readable medium having an operations management program embodied therein.

2. Description of the Related Art

There have been image transmission devices having a function for transmitting images scanned by a scanner part or image data loaded in a memory.

As this type of image transmission device becomes more sophisticated, information registered in the devices by users such as address book data and document data is increasing. Such information registered by users often includes strictly-confidential information such as personal information, in-house information and customer information. Therefore, security measures for protecting the registered information are becoming important.

Japanese Patent Laid-Open Publication No. 2004-5408 discloses a device with security features. The device authenticates users trying to use an image forming application installed therein by referring to prestored information.

Japanese Patent Laid-Open Publication No. 2000-276018 also discloses a device with security features. The device includes fingerprint reading means for reading fingerprint information, fingerprint registering means for registering the read fingerprint information, authenticating means for comparing preregistered fingerprint information with the fingerprint information read by the fingerprint reading means to authenticate a user, and operation restricting means for restricting operations of an image forming device according to a comparison result.

However, theses features presented in the above publications are designed for limiting operations available to users by authenticating the users according to specific methods, and are not security measures against customer engineers (maintenance operators) who handle device maintenance and repairs.

Maintenance operators need to be permitted to perform at least certain operations for device inspection and maintenance. For example, image data transmission in a transmission test may need to be allowed.

In many cases, however, device maintenance and repairs are outsourced to external contractors such as manufactures and related companies of the manufactures. Considering the recent awareness of the importance of security measures for image transmission devices, it is necessary to prevent leaks of confidential information caused by maintenance operators while permitting the maintenance operators to conduct necessary operations.

SUMMARY OF THE INVENTION

A general object of the present invention is to provide an image transmission device, an operations management method and a computer-readable medium having an operations management program embodied therein. A specific object of the present invention is to provide an image transmission device, an operations management method and a computer-readable medium having an operations management program embodied therein capable of preventing leaks of confidential information caused by a maintenance operator while permitting the to conduct maintenance operator necessary operations.

According to an aspect of the present invention, there is provided an image transmission device having a communication part capable of transmitting image data, comprising a managing/storing part that registers and stores personal identification information together with a maintenance operator's right for performing maintenance work, and a control part that enables predetermined minimum operations and/or performing acquisition of a log containing predetermined contents, when the image transmission device is used with the maintenance operator's right registered in the managing/storing part.

The control part preferably enables the predetermined minimum operations by limiting available operations and/or limiting items to be displayed. The log containing predetermined contents preferably includes any one or a combination of a log of performed operations, a log of transmitted contents, and a log of displayed items.

The control part preferably limits the available operations by any one or a combination of operations of preventing use of and reference to data registered in the device, restricting transmission of image data, preventing operations except minimum operations necessary for transmission, and limiting selectable transmission destinations.

It is preferable that the image transmission device further comprise a reading part to read images of an original document, and the control part to restrict the transmission of image data by permitting transmission of data of the images read by the reading part for only one time, or permitting transmission of only predetermined chart data for a communication test.

The control part preferably prevents the operations except minimum operations necessary for transmission by any one or a combination of operations of disabling redialing, preventing broadcast transmission, permitting transmission for only one time per line if plural lines are connected to the device, permitting transmission for only a predetermined number of times, and permitting only direct transmission.

The control part preferably limits the items to be displayed by hiding destinations registered in the device and/or hiding items used for redialing.

The managing/storing part preferably registers and stores personal identification information together with a manager's right. When the image transmission device is used with the manager's right registered in the managing/storing part, the control part preferably outputs the acquired log containing predetermined contents according to an input operation.

When the image transmission device is used with the manager's right registered in the managing/storing part, the control part preferably receives input that specifies operations available if the image transmission device is used with the maintenance operator's right.

It is preferable that the maintenance operator's right registered in the managing/storing part be associated with one of levels each specifying the minimum operations to be enabled, and the control part change available operations according to the level associated with the maintenance operator's right when the image transmission device is used with the maintenance operator's right registered in the managing/storing part.

When the image transmission device is used with the manager's right registered in the managing/storing part, the control part preferably receives input that specifies operations available for each of the levels of the maintenance operator's right.

According to another aspect of the present invention, there is provided an operations management method that comprises a maintenance operator registering step of registering and storing personal identification information together with a maintenance operator's right for performing maintenance work, and a control step of enabling predetermined minimum operations and/or performing acquisition of a log containing predetermined contents with the maintenance operator's right registered in the maintenance operator registering step.

The operations management method is preferably applied to an image transmission device having a communication part capable of transmitting image data.

It is preferable that the operations management method further comprise a manager registering step of registering and storing personal identification information together with a manager's right, and an output step of outputting the acquired log containing predetermined contents according to an input operation performed with the manager's right registered in the manager registering step.

It is also preferable that the operations management method further comprise a manager registering step of registering and storing personal identification information together with a manager's right, and an available operations specifying step of receiving input performed with the manager's right registered in the manager registering step, the input specifying operations available with the maintenance operator's right.

The maintenance operator's right registered in the maintenance operator registering step is preferably associated with one of levels each specifying the minimum operations to be enabled, and in the control step, available operations are preferably changed according to the level associated with the maintenance operator's right registered in the maintenance operator registering step.

According to still another aspect of the present invention, there is provided a computer-readable medium having an operations management program embodied therein, the program comprising a maintenance operator registering process of registering and storing personal identification information together with a maintenance operator's right for performing maintenance work, and a control process of enabling predetermined minimum operations and/or performing acquisition of a log containing predetermined contents with the maintenance operator's right registered in the maintenance operator registering process.

The computer-readable medium preferably is applied to an image transmission device having a communication part capable of transmitting image data.

According to the present invention, leaks of confidential information by maintenance operators can be prevented while permitting the maintenance operators to conduct necessary operations.

BRIEF DESCRIPTION OF THE DRAWINGS

FIG. 16 shows an example of a log;

DETAILED DESCRIPTION OF THE PREFERRED EMBODIMENT

Exemplary embodiments wherein an image transmission device of the present invention is applied to a fax machine are described in detail hereinafter with reference to the accompanying drawings.

The following embodiments exemplify preferred fax machines that restrict operations when a device user (fax machine user) is identified as a customer engineer so as to prevent confidential information from being leaked by the customer engineer.

First Embodiment

Figure 1:
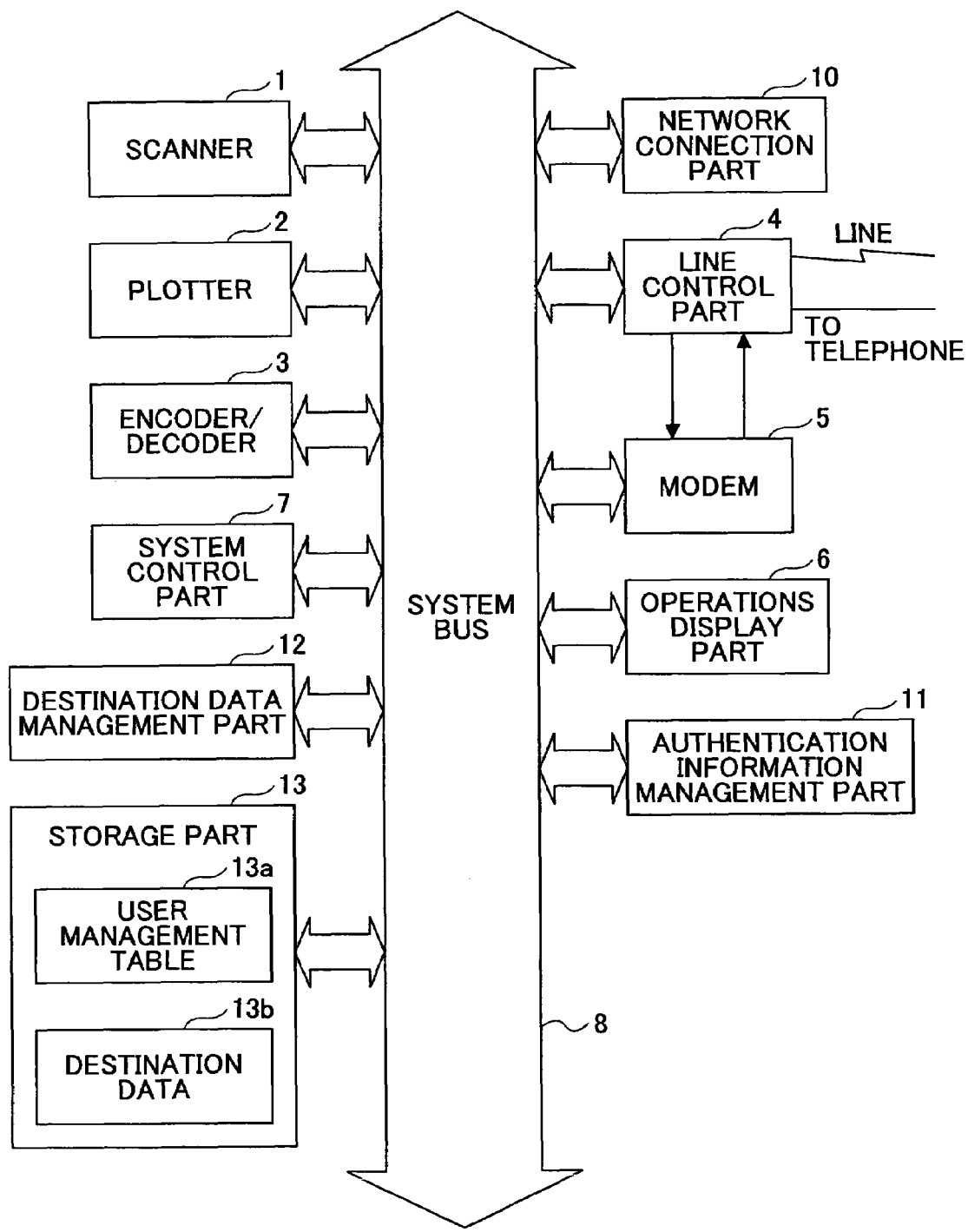
FIG. 1 is a schematic block diagram showing the configuration of a fax machine according to a first embodiment of the present invention.

Referring to FIG. 1, a fax machine according to a first embodiment of the present invention comprises a scanner 1, a plotter 2, a encoder/decoder 3, a line control part 4, a modem 5, an operations display part 6, a system control part 7, a network connection part 10, an authentication information management part 11, a destination data management part 12, and a storage part 13. The components 1 through 13 are connected to each other through a system bus 8.

The scanner (reading part) 1 is adapted to read images of an original document to convert them into image information (image data).

The plotter (image forming part) 2 serves as an output part for recording images on recording paper.

The encoder/decoder 3 is adapted to compress outgoing image information according to a known encoding method such as the MH (Modified Huffman) method, and to decode incoming image information for reproducing original image information.

The line control part (communication part) 4, to which a telephone line and a telephone set are connected, performs line control to originate and receive calls.

The modem 5 modulates and demodulates the image information to transmit the demodulated image information while transmitting various procedure signals for transmission control.

Figure 2:
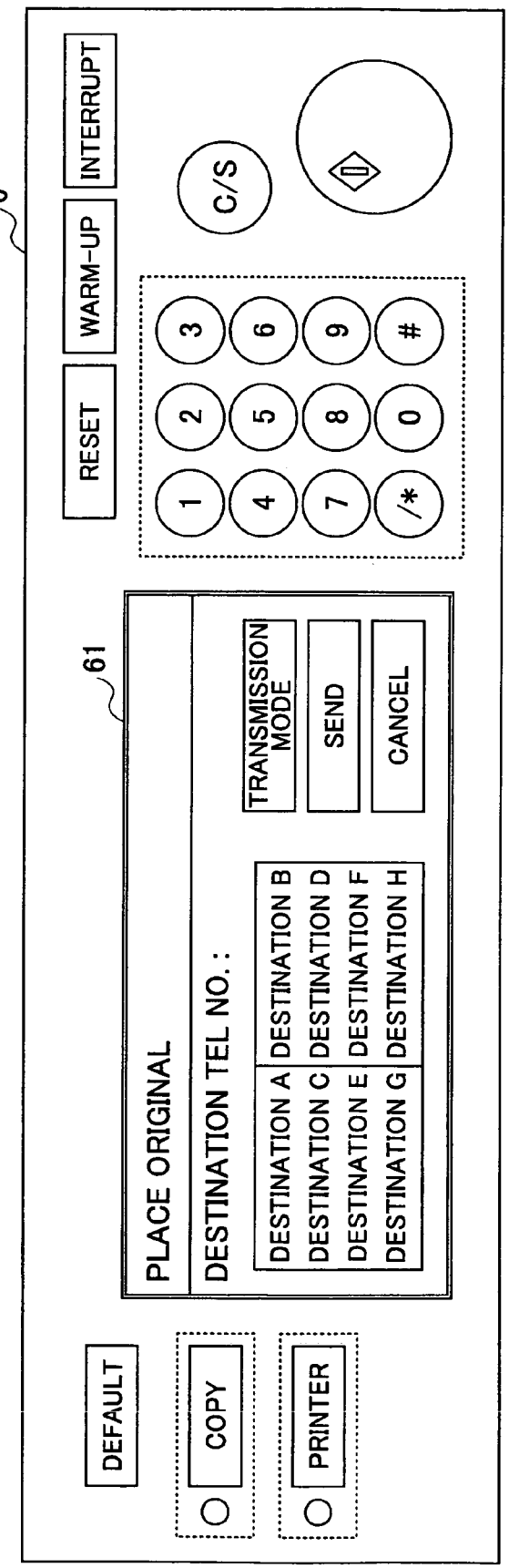
FIG. 2 shows an example of an operations display part.

The operations display part 6, as shown in FIG. 2, comprises a touch panel 61 and other operational tools. The operations display part 6 is adapted to display operation guides and operation states of the fax machine. The operations display part 6 is also used by a device user for performing various operations.

For example, with use of the operations display part 6, the device user can select manual reception. The device user can also specify whether to use a network for manual reception.

The system control part 7 is a microcomputer that controls the components of the fax machine.

The system bus 8 is a signal line for transmitting various control signals and data elements among the above components.

The network connection part 10 is connected to a network such as a LAN to perform operations such as mail reception.

The authentication information management part 11 manages authentication information for using the fax machine. Specifically, the authentication information management part 11 identifies whether a device user is a customer engineer, a device manager (fax machine manager) or a general user with reference to a user management table 13a stored in the storage part 13.

Figures 3, 4:
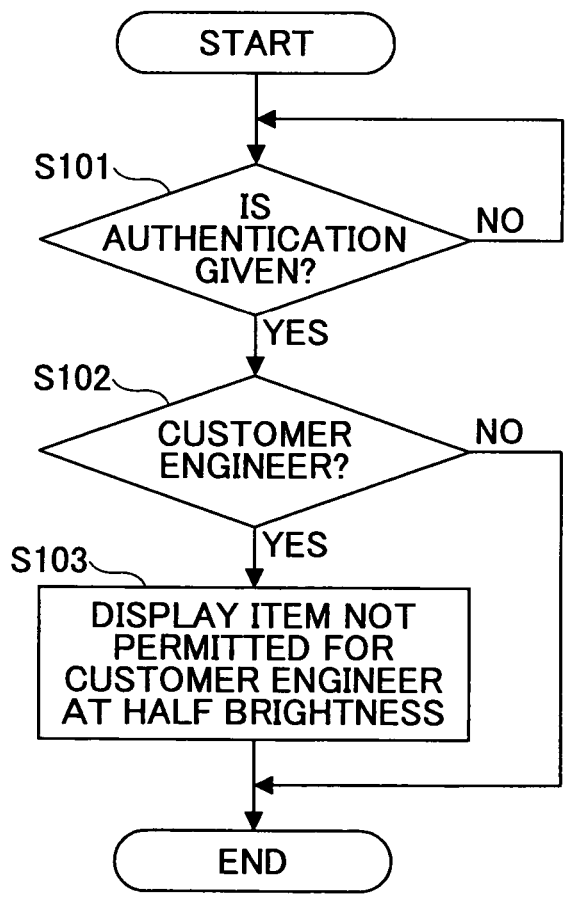
FIG. 3 shows an example of a user management table.
FIG. 4 is a flowchart showing an exemplary process of a fax machine according to the first embodiment of the present invention.

The user management table 13a (managing/storing part), as shown in FIG. 3, stores IDs (personal identification information) used for login. Each ID is associated with a password and a right as a manager, a general user, or a customer engineer.

The destination data management part 12 manages destination data 13b such as address books or speed dials registered in the storage part 13.

tion information management part 11 stores the registered information in the user management table 13a of the storage part 13 as shown in FIG. 3.

The authentication registration may be performed using the operations display part 6, or using an external computer connected to the fax machine.

When the device user starts to use the fax machine or logs in, authentication is performed. If the device user is identified as a customer engineer or a user registered with a right as a customer engineer (step S102; Yes), the system control part 7 disables operations that are not permitted to be performed by the customer engineer and displays the non-permitted operations in a manner different from permitted operations on the operations display part 6. For instance, the non-permitted operations are displayed at half brightness.

The permitted operations may be specified in advance by a user registered with a right as a manager.

As described above, according to the first embodiment, if the device user is identified as a customer engineer, operations are restricted. Therefore, for example, by limiting the permitted operations to the minimum necessary, the confidential information can be prevented from being disclosed from the fax machine by the customer engineer.

Second Embodiment

A fax machine according to a second embodiment of the present invention is described herein.

The second embodiment is different from the first embodiment in that customer engineers are classified into levels. Available operations are set with respect to each of the levels so as to vary depending on the levels.

Table 1 shows an example of the levels and the available operations set with respect to each of the levels. The level of a customer engineer is identified based on a login name and a password input for authentication.

The levels and the corresponding available operations are managed as rights in the user management table 13a by the authentication information management part 11.

TABLE 1

| CUSTOMER ENGINEER LEVEL | LOGIN NAME | PASSWORD | AVAILABLE OPERATIONS |
| --- | --- | --- | --- |
| LEVEL 1 | CE1 | CE1 | DIRECT TRANSMISSION, MEMORY TRANSMISSION, TRANSMISSION TO REGISTERED DESTINATION, TRANSMISSION TO DESTINATION DIRECTLY INPUT, DOCUMENT TRANSMISSION |
| LEVEL 2 | CE2 | CE2 | DIRECT TRANSMISSION, MEMORY TRANSMISSION, TRANSMISSION TO DESTINATION DIRECTLY INPUT, DOCUMENT TRANSMISSION |
| LEVEL 3 | CE3 | CE3 | DIRECT TRANSMISSION, TRANSMISSION TO DESTINATION DIRECTLY INPUT, DOCUMENT TRANSMISSION |
| LEVEL 4 | CE4 | CE4 | DIRECT TRANSMISSION, TRANSMISSION TO DESTINATION DIRECTLY INPUT |

The following describes operations of the fax machine according to a first embodiment of the present invention with reference to a flowchart of FIG. 4.

In this embodiment, if a device user is authorized as a customer engineer, only operations permitted to be performed by the customer engineer are enabled.

A device user performs authentication registration for using the fax machine (step S101). In this authentication registration, an ID as a user of the fax machine, a password and a right are registered in the fax machine. The authentica- In Table 1, the operations available to a customer engineer registered with level 1 include direct transmission, memory transmission, transmission to a destination registered in the fax machine, transmission to a destination directly input, and document transmission. Operations available to a customer engineer registered with level 2 include direct transmission, memory transmission, transmission to a destination directly input, and document transmission. Operations available to a customer engineer registered with level 3 include direct transmission, transmission to a destination directly input, and document transmission. Operations available to a customer engineer registered with level 4 include direct transmission and transmission to a destination directly input.

In the above example, available transmission methods are different from level to level. Therefore, the available operations vary depending on the levels. The system control part 7 displays the permitted and non-permitted operations in different manners on the operations display part 6 as in the first embodiment.

That is, the system control part 7 changes permitted operations according to the level of a customer engineer identified in authentication performed when the customer engineer starts to use the fax machine.

According to the second embodiment of the present invention, customer engineers can be classified into levels according to trustworthiness of the customer engineers or the like. Therefore, for example, by setting different restrictions on the operations with respect to each of the levels, permitted operations can be changed depending on the trustworthiness of the customer engineers.

Third Embodiment

A fax machine according to a third embodiment of the present invention is described herein.

The third embodiment is different from the first embodiment in that use of and reference to data registered in the fax machine such as destination data are prevented if a device user is identified as a customer engineer in authentication.

Figure 5:
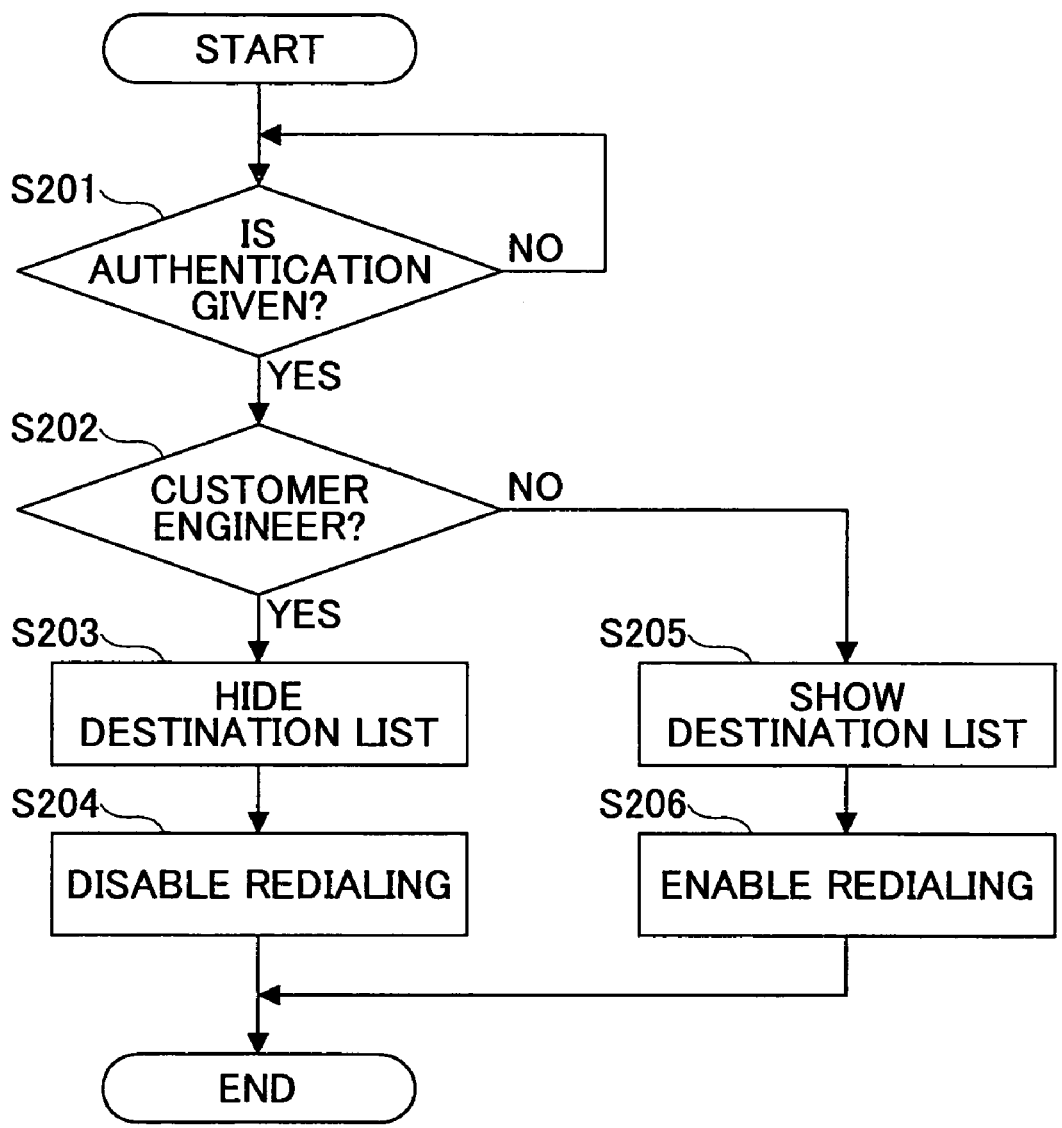
FIG. 5 is a flowchart showing an exemplary process of a fax machine according to a third embodiment of the present invention.

The following describes operations of the fax machine according to the third embodiment of the present invention with reference to a flowchart of FIG. 5.

FIG. 5 illustrates an exemplary process for preventing use of and reference to a destination list and redialing by hiding the destination list and masking a redial key if a device user is a customer engineer.

A device user performs authentication registration for using the fax machine (step S201) in the same manner as in step S101.

When the device user starts to use the fax machine, authentication is performed. If the device user is identified as a customer engineer (step S202; Yes), the system control part 7 hides a destination list on the operations display part 6 as in FIG. 6B (step S203) and disables redialing (step S204). When redialing is disabled, displaying a number for redialing is also prevented. Therefore, the customer engineer cannot use redialing or refer to a fax number for redialing.

Figure 6A:
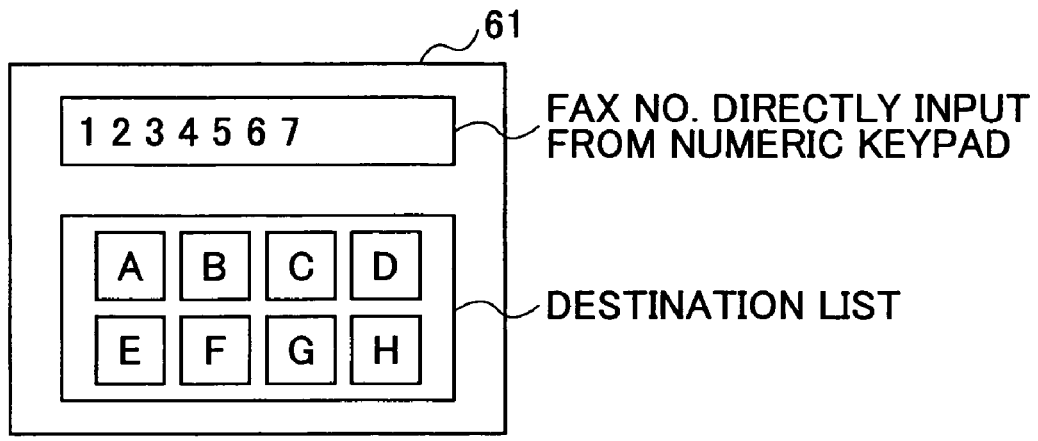
FIG. 6A shows an example of a display screen for non-customer engineers.
Figure 6B:
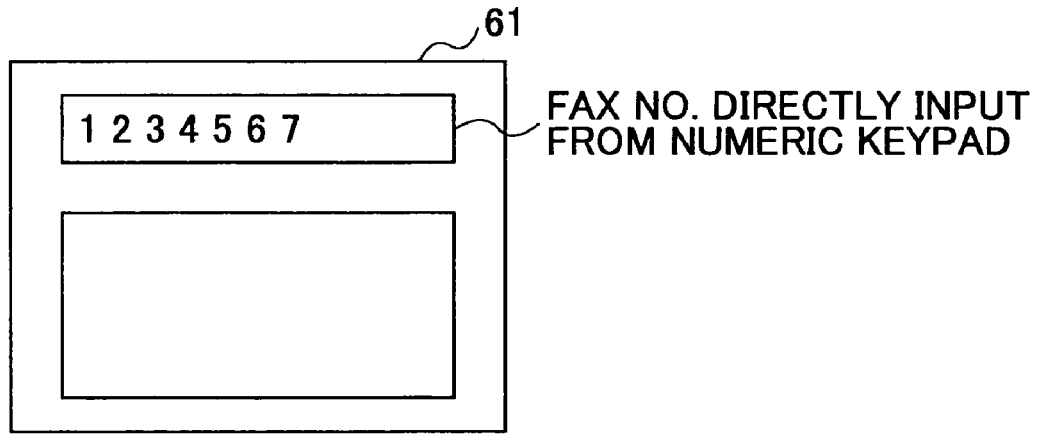
FIG. 6B shows an example of a display screen for customer engineers.

FIG. 6A shows a screen of the touch panel 61 that is displayed when a user such as a general user except customer engineers uses the fax machine. On the other hand, FIG. 6B shows a screen of the touch panel 61 that is displayed when a customer engineer uses the fax machine.

That is, the destination list is displayed on the touch panel 61 when a user who is not a customer engineer logs in, but the destination list is not displayed on the touch panel 61 when a customer engineer logs in.

Referring back to FIG. 5, when the user is identified as not being a customer engineer (step S202; Yes), the system control part 7 shows the destination list (step S205) and enables redialing (step S206).

In this way, the customer engineer is prevented from using and referring to registered destinations for a transmission operation.

In other words, the customer engineer needs to directly input a destination from a numeric keypad or the like to perform transmission.

Since the customer engineer cannot use or refer to the destinations registered in the fax machine and the numbers for redialing, leaks of destination data registered in the fax machine by the customer engineer can be prevented.

As described above, according to the third embodiment, if the device user is identified as a customer engineer in authentication, use of and reference to data registered in the fax machine such as destination data are prevented. Therefore, information registered in the fax machine can be kept in confidence.

The customer engineer level classification of the second embodiment may be applied to the third embodiment. More specifically, permission to display predetermined information may be given to customer engineers according to their levels.

With this configuration, available information can be changed depending on trustworthiness of the customer engineers.

Fourth Embodiment

A fax machine according to a fourth embodiment of the present invention is described herein.

The fourth embodiment is different from the first embodiment in that volume or type of data that can be transmitted to the outside from the device is restricted if a device user is identified as a customer engineer in authentication.

Figure 7:
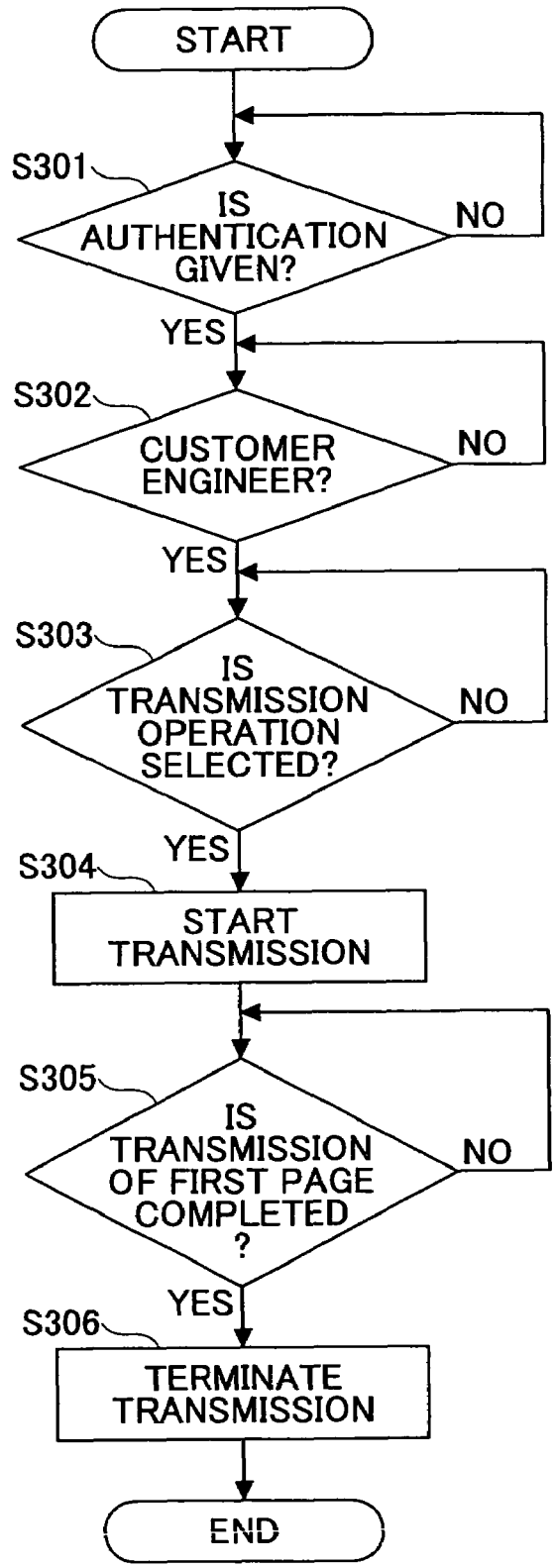
FIG. 7 is a flowchart showing an exemplary process according to a fourth embodiment of the present invention.
Figure 8:
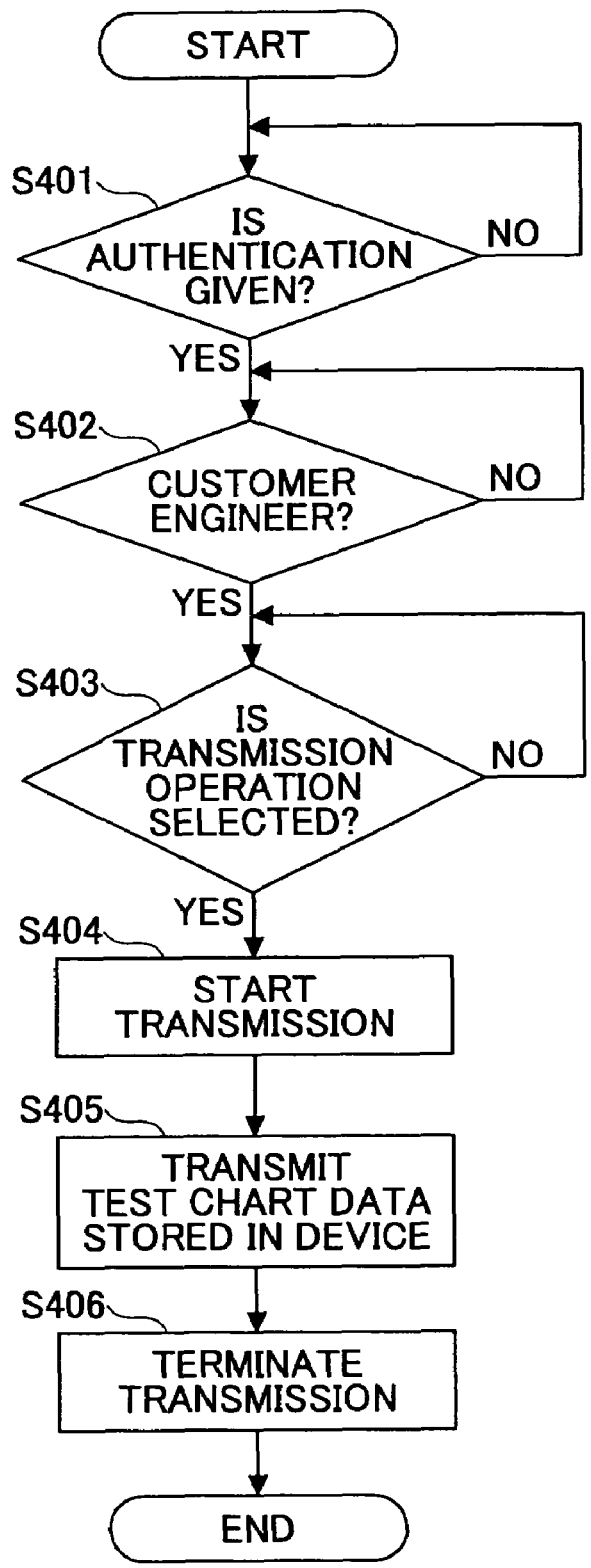
FIG. 8 is a flowchart showing another exemplary process according to the fourth embodiment of the present invention.

The following describes operations of the fax machine according to the fourth embodiment of the present invention with reference to flowcharts of FIGS. 7 and 8.

FIG. 7 illustrates an exemplary process for limiting transmission data to only one page of a document if a device user is a customer engineer.

Referring to FIG. 7, a device user performs authentication registration for using the fax machine (step S301) in the same manner as in step S101.

When the device user starts to use the fax machine, authentication is performed. If the device user is identified as a customer engineer (step S302; Yes) and a transmission operation is selected (step S303; Yes), images are read by the scanner 1 and image data transmission is started under the control of the system control part 7 (step S304).

When one page is transmitted (step S305), the transmission is forcibly terminated (step S306) even if there are plural documents.

With these operations, data that the customer engineer can transmit are limited to one page, which may be necessary for device installation, maintenance or inspection, and transmission of other image data is prevented. Therefore, leaks of document data by the customer engineer can be efficiently prevented.

The customer engineer level classification of the second embodiment may be included in the above described operations of FIG. 7. More specifically, permission to transmit a predetermined number of pages may be given to customer engineers according to their levels.

With this configuration, the number of pages that the customer engineers are permitted to transmit can be changed depending on the trustworthiness of the customer engineers.

FIG. 8 illustrates another exemplary process of this embodiment for limiting transmission data to chart data for a communication test prestored in the fax machine if a device user is a customer engineer.

Referring to FIG. 8, a device user performs authentication registration for using the fax machine (step S401) in the same manner as in step S101.

When the device user starts to use the fax machine, authentication is performed to identify the device user. Then, if a transmission operation is selected (step S403; Yes), the system control part 7 starts transmission (step S404).

If the device user who has selected the transmission operation is a customer engineer (step S402; Yes), the chart data for a communication test stored in the fax machine are used as transmission data (step S405, step S406).

With these operations, data that the customer engineer can transmit are limited to predetermined image data, which may be necessary for device installation, maintenance or inspection such as the chart data for a communication test prestored in the fax machine, and transmission of other image data is prevented. Therefore, leaks of document data by the customer engineer can be efficiently prevented.

As described above, according to the fourth embodiment, if the device user is identified as a customer engineer in authentication, volume or type of data that can be transmitted to the outside from the fax machine is restricted. Therefore, leaks of confidential information can be efficiently prevented.

The customer engineer level classification of the second embodiment may be included in the above described operations of FIG. 8. More specifically, permission to transmit a predetermined number of pages other than the chart data for communication test may be given to customer engineers according to their levels.

With this configuration, the types of data and the number of pages that the customer engineers are permitted to transmit can be changed depending on trustworthiness of the customer engineers.

Fifth Embodiment

A fax machine according to a fifth embodiment of the present invention is described herein.

According to the fifth embodiment, transmission operations are restricted if a device user is identified as a customer engineer in authentication.

The following describes operations of the fax machine according to the fifth embodiment of the present invention with reference to flowcharts of FIGS. 9, 11, 12, 13 and 14.

Figure 9:
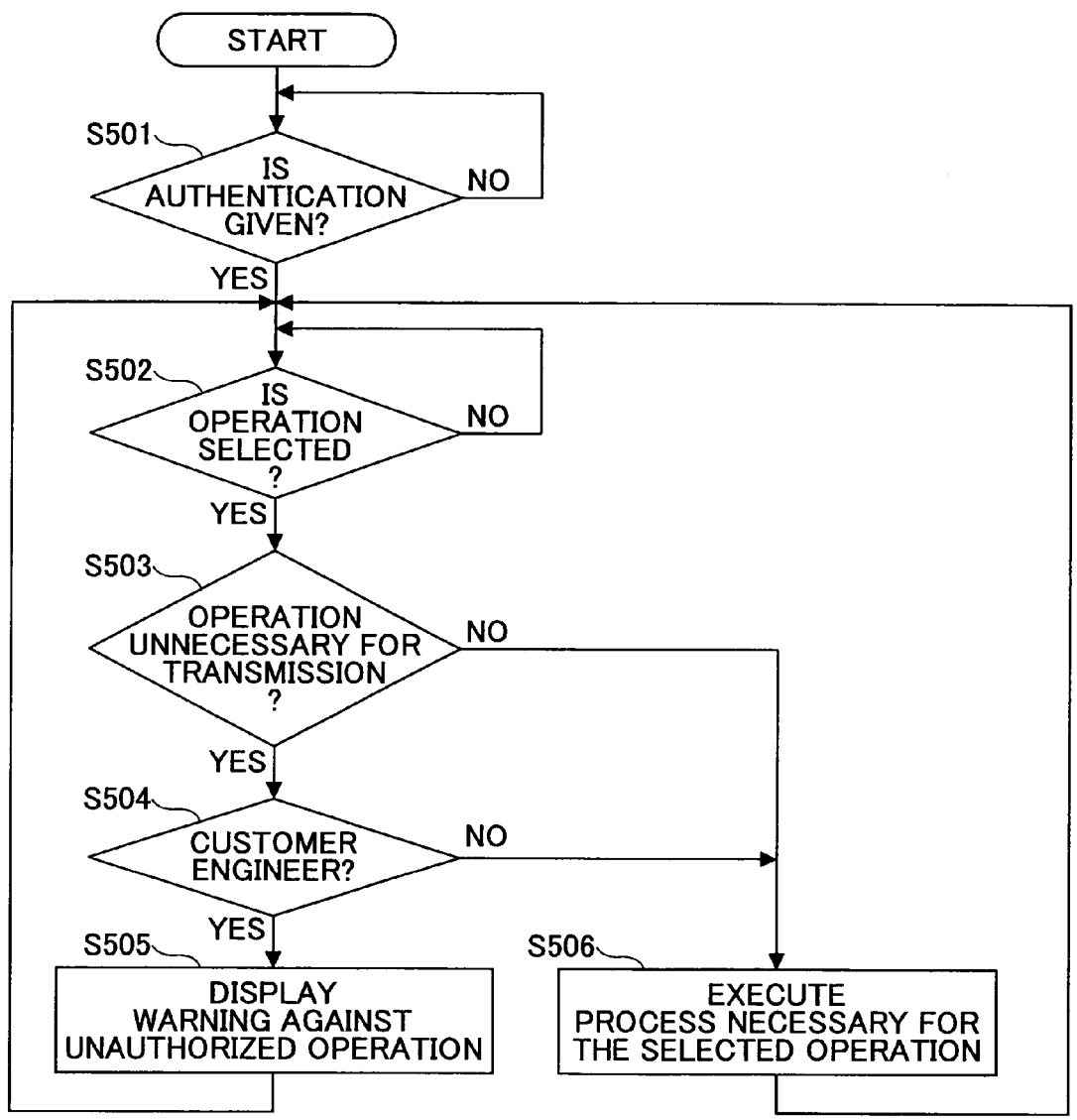
FIG. 9 is a flowchart showing a first exemplary process according to a fifth embodiment of the present invention.

FIG. 9 illustrates a first exemplary process of the fifth embodiment for permitting only operations necessary for device installation, maintenance or inspection, and preventing other operations if a device user is identified as a customer engineer in authentication.

Referring to FIG. 9, a device user performs authentication registration for using the fax machine (step S501) in the same manner as in step S101.

When the device user starts to use the fax machine, authentication is performed to identify the device user. If an operation is selected (step S502; Yes) and the selected operation is necessary for a transmission operation (step S503; No), the system control part 7 executes a process necessary for the selected operation (step S506).

Figure 10:
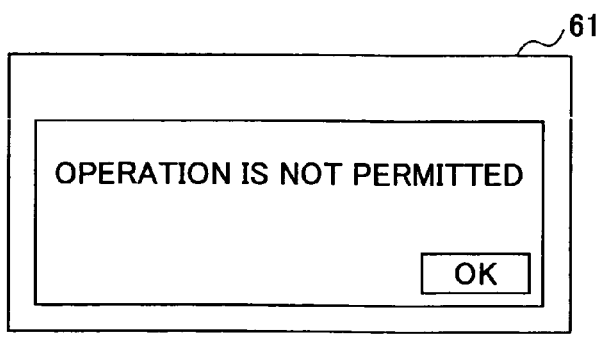
FIG. 10 shows an example of a warning against an unauthorized operation.

If the selected operation is unnecessary for the transmission operation (step S503; Yes) and the device user is a customer engineer (step S504; Yes), the operations display part 6 displays a warning against unauthorized operations as shown in FIG. 10 under the control of the system control part 7 (step S505).

If the device user is not a customer engineer (step S504; No), the system control part 7 executes a process necessary for the selected operation (step S506).

With this first exemplary process, operations unnecessary for the transmission operation are prevented when the fax machine is used by the customer engineer.

The customer engineer level classification of the second embodiment may be included in the first exemplary process of the fifth embodiment. More specifically, permission to perform predetermined operations unnecessary for the transmission operations may be given to customer engineers according to their levels.

With this configuration, available operations can be changed depending on the trustworthiness of the customer engineers.

Figure 11:
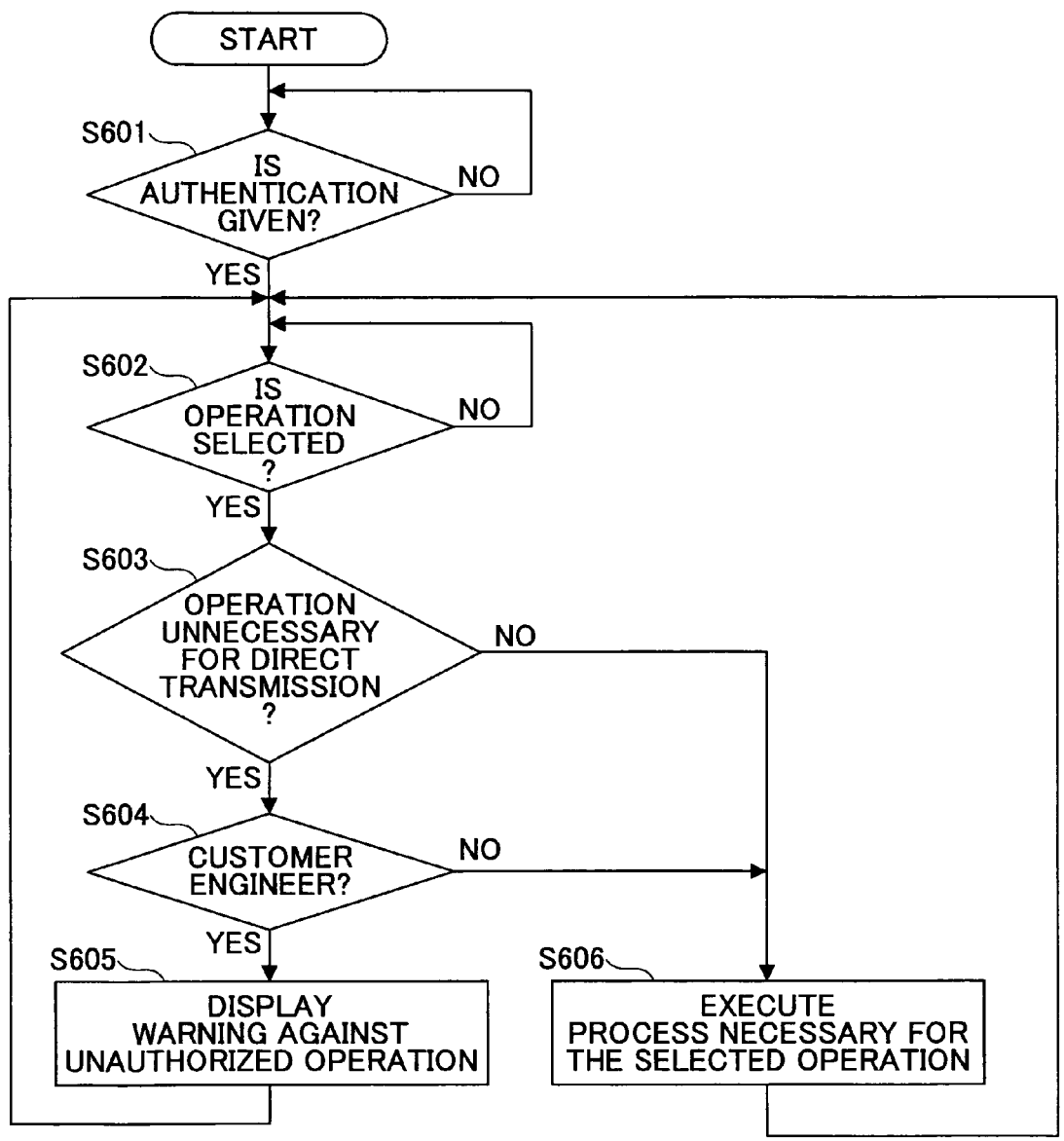
FIG. 11 is a flowchart showing a second exemplary process according to the fifth embodiment of the present invention.

FIG. 11 illustrates a second exemplary process of the fifth embodiment for permitting only a direct transmission operation (i.e. an operation for directly transmitting images read by the scanner 1), and preventing an operation for transmitting images loaded in a memory.

Referring to FIG. 11, a device user performs authentication registration for using the fax machine (step S601) in the same manner as in step S101.

When the device user starts to use the fax machine, authentication is performed to identify the device user. If an operation is selected (step S602; Yes) and the selected operation is necessary for a direct transmission operation (step S603; No), the system control part 7 executes a process necessary for the selected operation (step S606).

If the selected operation is unnecessary for the direct transmission operation (step S603; Yes) and the device user is a customer engineer (step S604; Yes), the operations display part 6 displays a warning against unauthorized operations as shown in FIG. 10 under the control of the system control part 7 (step S605).

If the device user is not a customer engineer (step S604; No), the system control part 7 executes a process necessary for the selected operation (step S606).

With this second exemplary process, operations unnecessary for the direct transmission operation are prevented when the fax machine is used by the customer engineer.

The customer engineer level classification of the second embodiment may be included in the second exemplary process of the fifth embodiment. More specifically, permission to perform predetermined operations other than the direct transmission operation may be given to customer engineers according to their levels.

With this configuration, available operations other than the direct transmission operation can be changed depending on the trustworthiness of the customer engineers.

Figure 12:
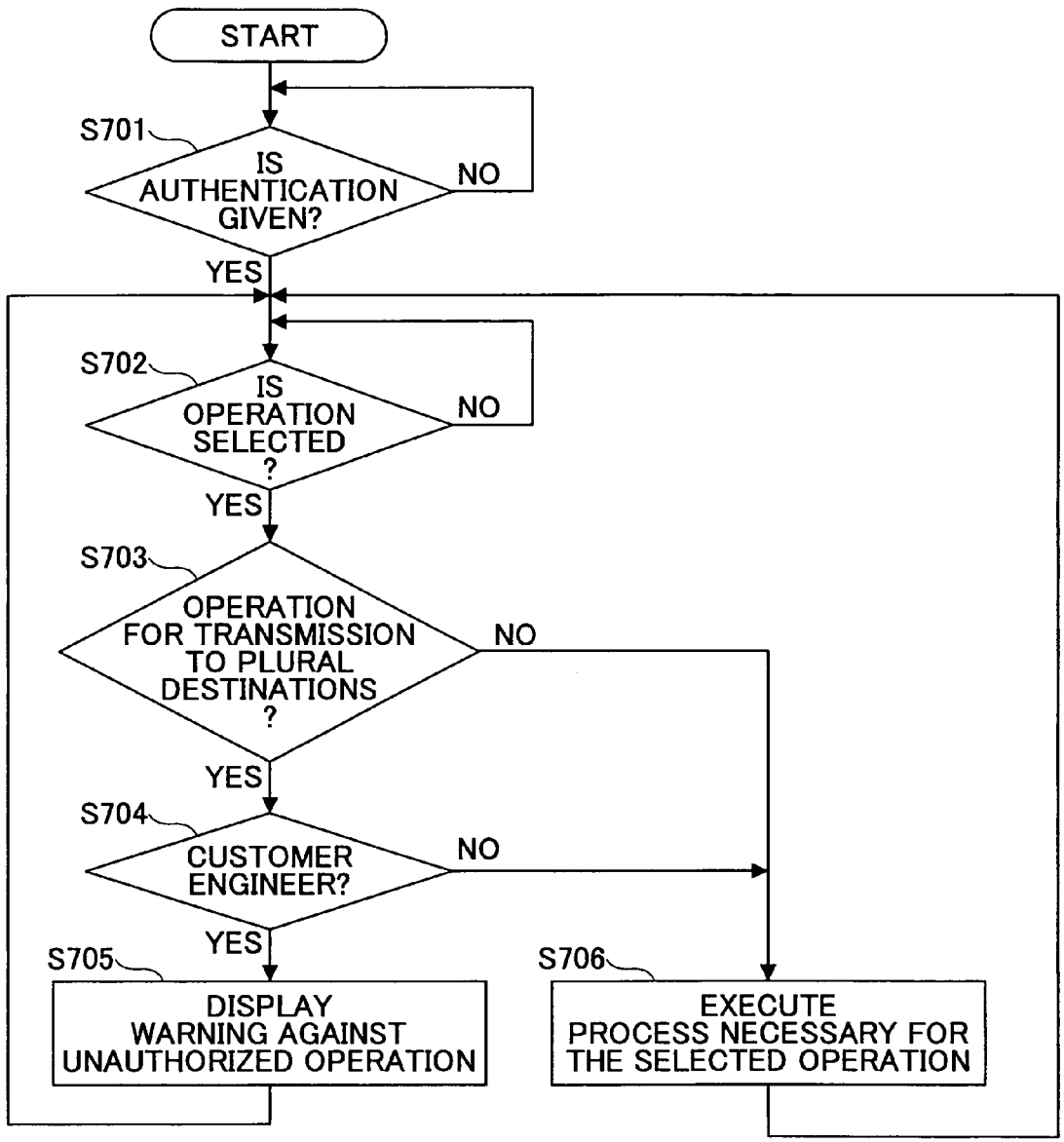
FIG. 12 is a flowchart showing a third exemplary process according to the fifth embodiment of the present invention.

FIG. 12 illustrates a third exemplary process of the fifth embodiment for preventing transmission to plural destinations (broadcast transmission) if a device user is a customer engineer.

Referring to FIG. 12, a device user performs authentication registration for using the fax machine (step S701) in the same manner as in step S101.

When the device user starts to use the fax machine, authentication is performed to identify the device user. If an operation is selected (step S702; Yes) and the selected operation is not a transmission operation to plural destinations (step S703; No), the system control part 7 executes a process necessary for the selected operation (step S706).

If the selected operation is a transmission operation to plural destination (step S703; Yes) and the device user is a customer engineer (step S704; Yes), the operations display part 6 displays a warning against unauthorized operations as shown in FIG. 10 under the control of the system control part 7 (step S705).

If the device user is not a customer engineer (step S704; No), the system control part 7 executes a process necessary for the selected operation (step S706).

With this third exemplary process, transmission to plural destinations (broadcast transmission) is prevented when the fax machine is used by the customer engineer.

The customer engineer level classification of the second embodiment may be included in the third exemplary process of the fifth embodiment. More specifically, permission for broadcast transmission may be given to customer engineers with predetermined conditions according to their levels.

With this configuration, the conditions of the broadcast transmission can be changed depending on trustworthiness of the customer engineers.

Figure 13:
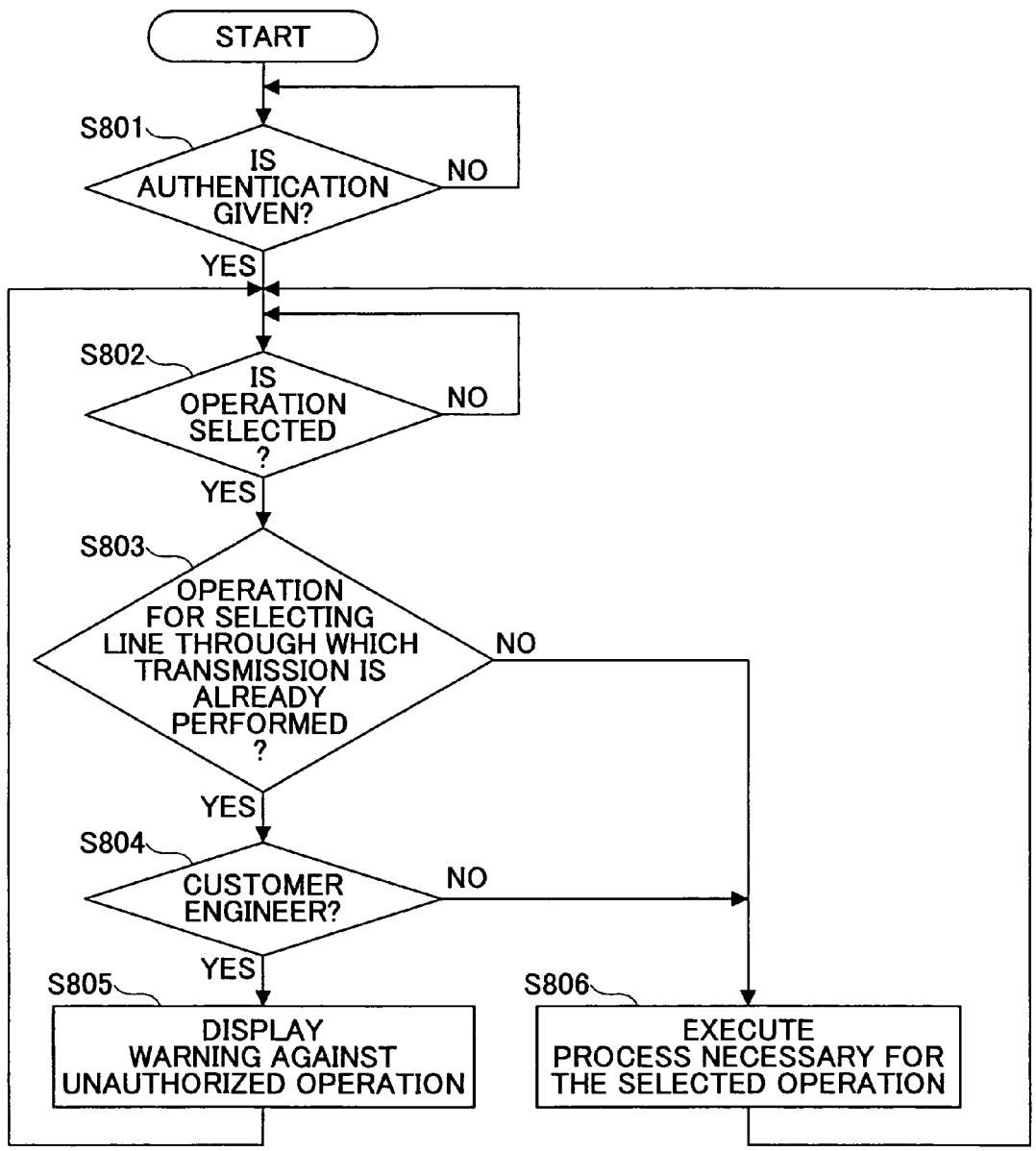
FIG. 13 is a flowchart showing a fourth exemplary process according to the fifth embodiment of the present invention.

FIG. 13 illustrates a fourth exemplary process of the fifth embodiment for permitting only one transmission operation per line if a fax machine connected to plural lines is used by a customer engineer.

Referring to FIG. 13, a device user performs authentication registration for using the fax machine (step S801) in the same manner as in step S101.

When the device user starts to use the fax machine, authentication is performed to identify the device user. If an operation is selected (step S802; Yes) and the selected operation is not an operation for selecting a line through which transmission has been already performed (step S803; No), the system control part 7 executes a process necessary for the selected operation (step S806).

If the selected operation is an operation for selecting a line through which transmission has been already performed (step S803; Yes) and the device user is a customer engineer (step S804; Yes), the operations display part 6 displays a warning against unauthorized operations as shown in FIG. 10 under the control of the system control part 7 (step S805).

If the device user is not a customer engineer (step S804; No), the system control part 7 executes a process necessary for the selected operation (step S806).

With this fourth exemplary process, only one transmission operation per line is permitted for a fax machine connected to plural lines when the device is used by the customer engineer.

The customer engineer level classification of the second embodiment may be included in the fourth exemplary process of the fifth embodiment. More specifically, permission for transmission per line for a predetermined number of times may be given to customer engineers according to their levels within a predetermined range.

With this configuration, the number of permitted transmission operations per line can be changed depending on the trustworthiness of the customer engineers.

Figure 14:
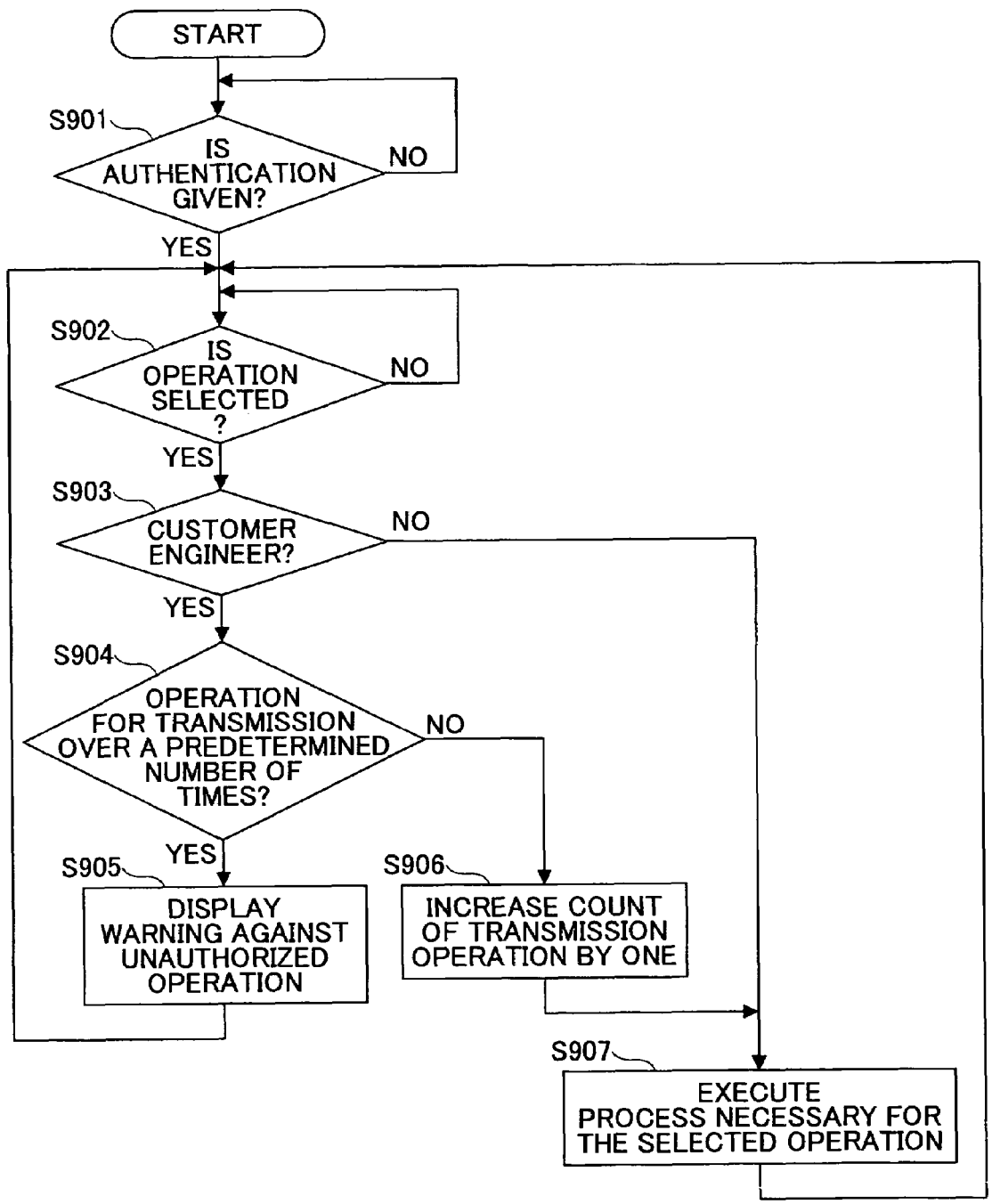
FIG. 14 is a flowchart showing a fifth exemplary process according to the fifth embodiment of the present invention.

FIG. 14 illustrates a fifth exemplary process of the fifth embodiment for permitting a predetermined number of transmission operations if a device user is a customer engineer.

Referring to FIG. 14, a device user performs authentication registration for using the fax machine (step S901) in the same manner as in step S101.

When the device user starts to use the fax machine, authentication is performed. Then, the device user selects a transmission operation (step S902; Yes). If the device user is identified as a customer engineer (step S903; Yes) and the predetermined number of transmission operations have already been performed (step S904; Yes), the operations display part 6 displays a warning against unauthorized operations as shown in FIG. 10 under the control of the system control part 7 (step S905).

If the device user is identified as a customer engineer (step S903; Yes) and the predetermined number of transmission operations have not been performed (step S904; No), the system control part 7 increases the count of transmission operations by one (step S906) and executes a process necessary for the selected operation (step S907).

If the device user is not a customer engineer (step S903; No), the system control part 7 executes a process necessary for the selected operation (step S907).

With this fifth exemplary process, the predetermined number of transmission operations are permitted when the device is used by the customer engineer.

The customer engineer level classification of the second embodiment may be included in the fifth exemplary process of the fifth embodiment. More specifically, permission to perform the predetermined number of transmission operations may be given to customer engineers according to their levels.

With this configuration, the number of permitted transmission operations can be changed depending on the trustworthiness of the customer engineers.

As described above, according to the fifth embodiment, if the device user is identified as a customer engineer in authentication, transmission operations are restricted to prevent unnecessary transmission operations. Therefore, leaks of confidential information can be efficiently prevented.

Sixth Embodiment

A fax machine according to a sixth embodiment of the present invention is described herein.

The sixth embodiment is different from the first through fifth embodiments in that if a device user is identified as a customer engineer in authentication, a log of operations performed by the customer engineer and items displayed for the operations are recorded so that a manager of the device can review the log.

Figure 15:
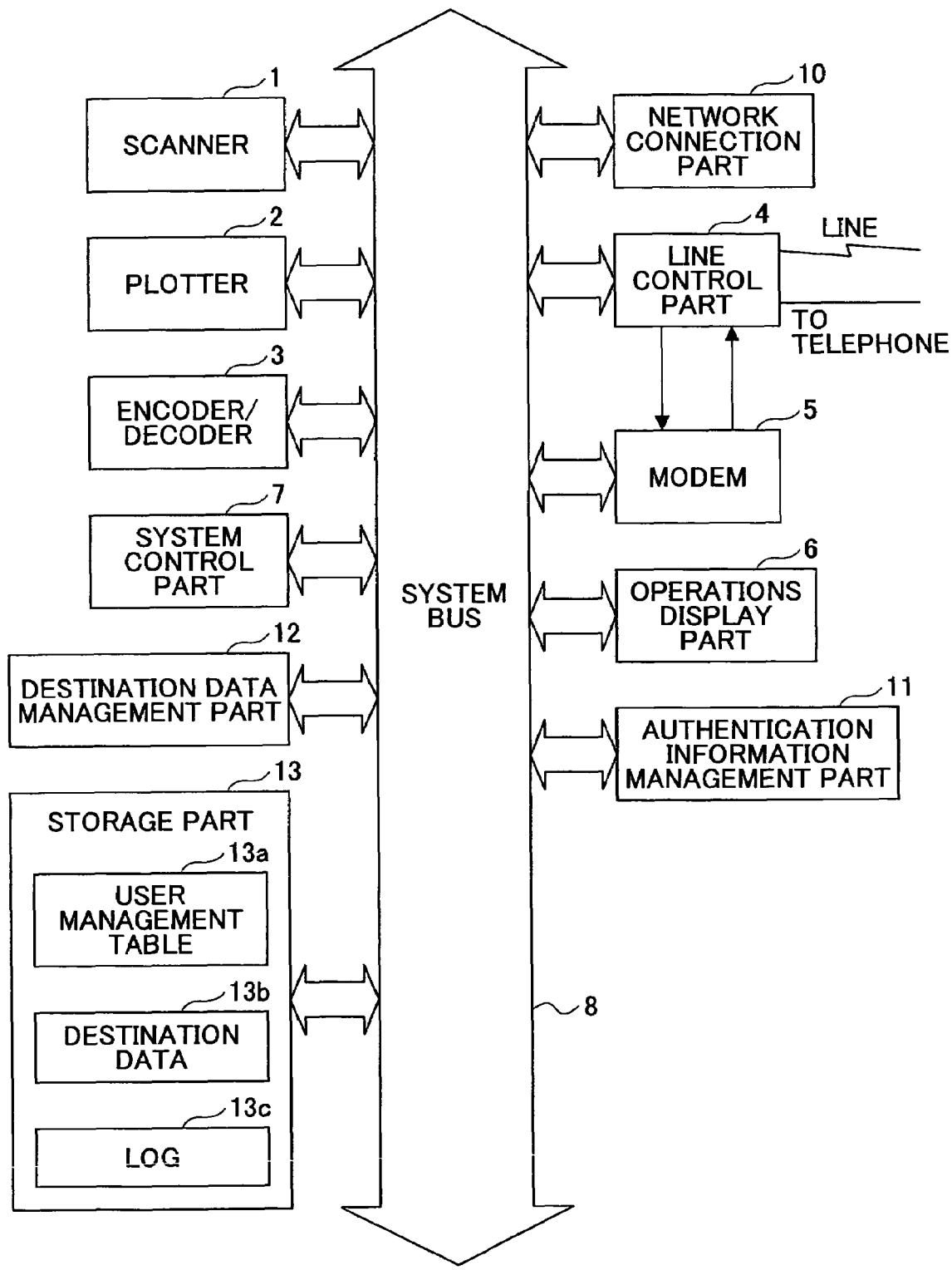
FIG. 15 is a schematic block diagram showing the configuration of a fax machine according to a sixth embodiment of the present invention.

Referring to FIG. 15, the fax machined of the sixth embodiment stores a log 13c of operations performed by customer engineers and related data in the storage part 13 in addition to the data stored in the first embodiment.

As shown in FIG. 16, the log 13c stores date and time when the customer engineers perform operations, together with login IDs of the customer engineers, performed operations, displayed items, and transmitted data.

That is, when a device user identified as a customer engineer performs an operation in the first through fifth embodiment, the system control part 7 acquires information on performed operations, displayed items and transmitted data. Then, the system control part 7 stores the acquired information together with the ID of the customer engineer as the log 13c in the storage part 13.

Figure 17:
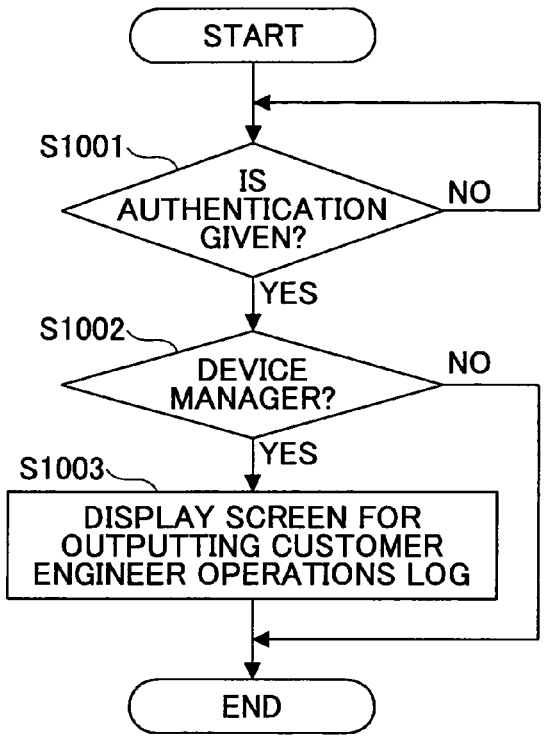
FIG. 17 is a flowchart showing an exemplary process of a fax machine according to the sixth embodiment of the present invention.

The following describes operations of the fax machine according to the sixth embodiment of the present invention with reference to the flowchart of FIG. 17.

FIG. 17 illustrates an exemplary process for allowing a device manager to know of operations performed by customer engineers.

More specifically, with the operations shown in FIG. 17, the device manager can know of the operations performed by the customer engineers by outputting an operations log of the customer engineers with use of an output operations screen.

A device user performs authentication registration for using the fax machine (step S1001) in the same manner as in step S101.

When the device user starts to use the fax machine, authentication is performed. If the device user is identified as a device manager (step S1002; Yes), the system control part 7 displays an output operations screen on the operations display part 6 to allow the output of the log 13c of the operations performed by the customer engineers.

If the device user is not a device manager (step S1002; No), the output operations screen is not displayed. Therefore, the log 13c of the operations performed by the customer engineers cannot be output.

The log 13c may be output by any method as long as the device manager can review the log 13c. For example, the log 13c may be output by printing on recording paper by the plotter (image forming part) 2, displaying on the operations display part 6, or by sending to the manager as e-mail.

As described above, according to the sixth embodiment, a log including operations performed by customer engineers, displayed items, and transmitted data can be recorded. Moreover, a device manager can output the log to know of the operations performed by the customer engineers.

Therefore, unauthorized use by the customer engineers is monitored, contributing to preventing the customer engineers from leaking the information registered in the fax machine as confidential.

Seventh Embodiment

A fax machine according to a seventh embodiment of the present invention is described herein.

The seventh embodiment is different from the first through sixth embodiments in that a manager who manages a device can specify operations available to a device user identified as a customer engineer in authentication.

Figure 18:
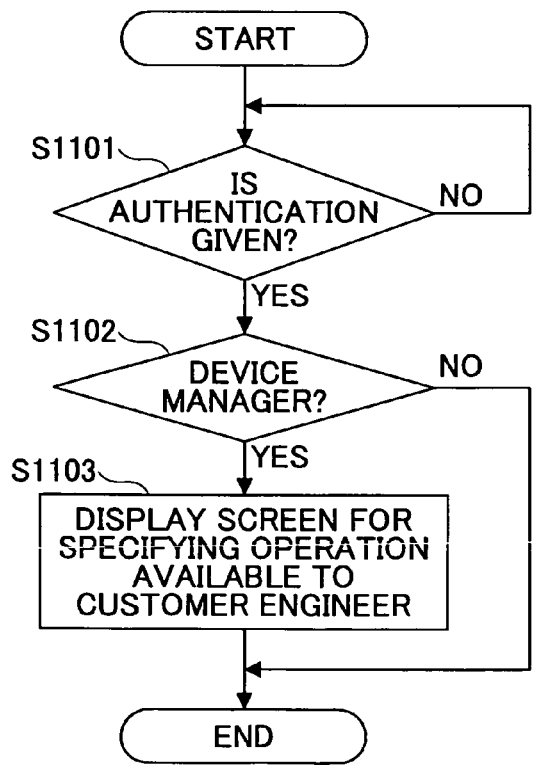
FIG. 18 is a flowchart showing an exemplary process of a fax machine according to a seventh embodiment of the present invention.

The following describes operations of the fax machine according to the seventh embodiment of the present invention with reference to a flowchart of FIG. 18.

FIG. 18 illustrates an exemplary process for allowing a device user identified as a device manager to display a configuration screen and specify or configure operations available to customer engineers in view of the status of the fax machine such as frequency of use or confidential level of the information stored therein.

A device user performs authentication registration for using the fax machine (step S1101) in the same manner as in step S101.

When the device user starts to use the fax machine, authentication is performed. If the device user is identified as a device manager (step S1102; Yes), the system control part 7 displays a configuration screen on the operations display part 6 to allow the device manager to specify or configure operations available to the customer engineers.

If the device user is not a device manager (step S1102; No), the configuration screen is not displayed.

With use of the configuration screen displayed in step S1103, the device manager can specify, for example, whether to permit a destination selecting operation, transmission of document data, etc. Also, the number of transmission operations as well as other configurations may be set on the configuration screen.

The customer engineer level classification of the second embodiment may be applied to the seventh embodiment. In that case, the configuration screen displayed in step S1103 may be arranged so that the available operations can be specified or configured for each level. That is, the device manager can specify or configure the operations available to the customer engineers for each level.

As described above, according to the seventh embodiment, if the device user is identified as a device manager, the device manager can specify or configure operations available to customer engineers in view of the status of the fax machine.

In addition, when the customer engineers are classified into different levels, the device user identified as the device manager can specify or configure the operations available to the customer engineers for each level.

Eight Embodiment

A fax machine according to an eighth embodiment of the present invention is described herein.

The eighth embodiment is different from the first through seventh embodiments in that if a device user is identified as a customer engineer, transmission destinations that the customer engineer can select are limited.

Figure 19:
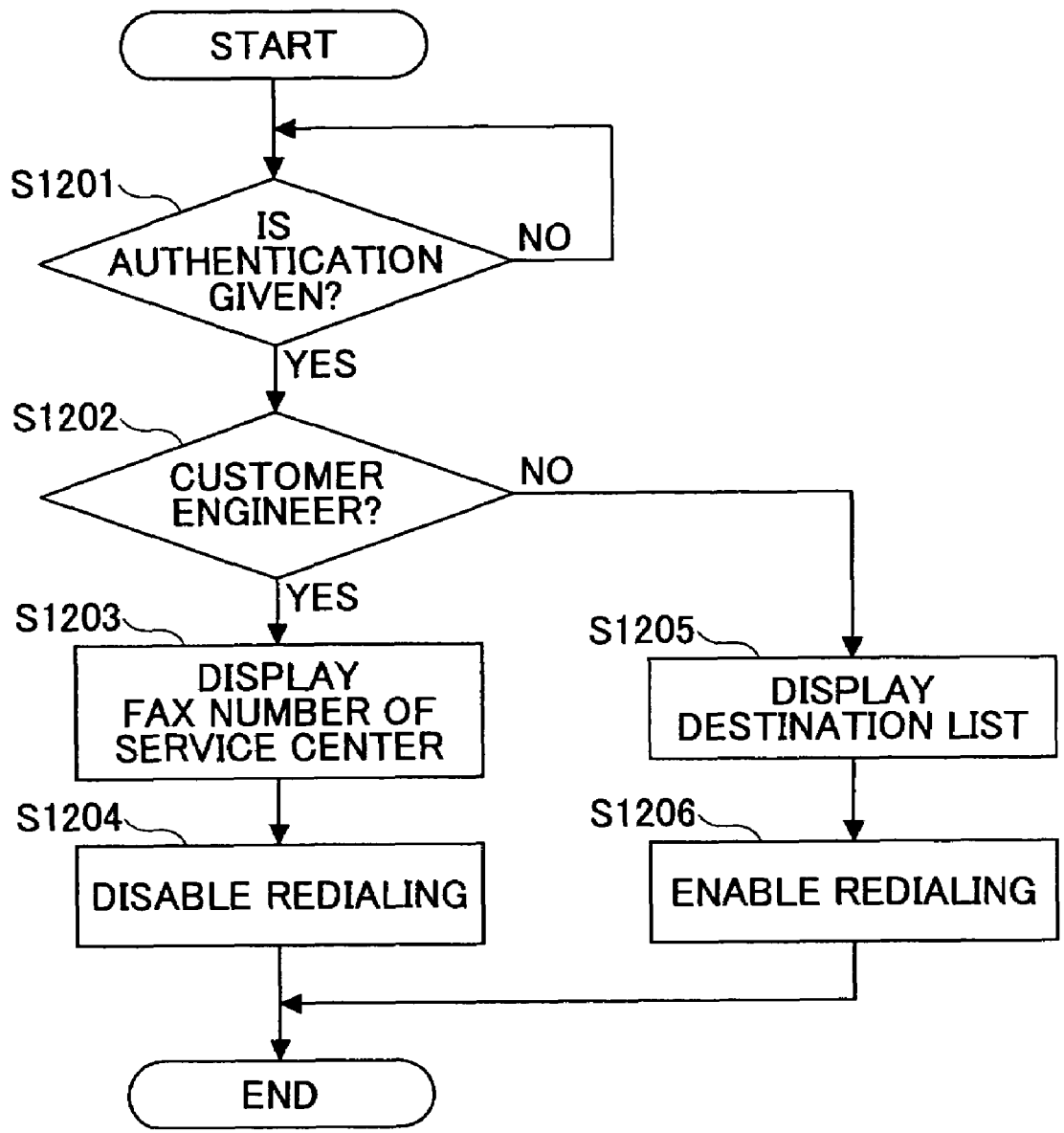
FIG. 19 is a flowchart showing an exemplary process of a fax machine according to an eighth embodiment of the present invention.

The following describes operations of the fax machine according to the eighth embodiment of the present invention with reference to a flowchart of FIG. 19.

FIG. 19 illustrates an exemplary process for limiting a destination for transmission tests to a service center prereg- isterd in the destination list by displaying a fax number of the service center if a device user is a customer engineer.

A device user performs authentication registration for using the fax machine (step S1201) in the same manner as in step S101.

When the device user starts to use the fax machine, authentication is performed. If the device user is identified as a customer engineer (step S1202; Yes), the system control part 7 displays a preregistered fax number of a service center on the operations display part 6 (step S1203). Then, the system control part 7 disables redialing (step S1204).

If there are plural service centers, the fax number of the nearest service center or a predetermined service center may be displayed.

If the device user is not a customer engineer (step S1202; No), destinations registered in the fax machine are displayed (step S1205) and redialing is enabled (step S1206).

As described above, according to the eighth embodiment, if the device user is identified as a customer engineer, transmission destinations that the customer engineer can select are limited to predetermined transmission destinations. For example, destinations that the customer engineer selects in a transmission test for the device installation can be limited.

Therefore, confidential information registered in the fax machine can be efficiently prevented from being leaked by the customer engineer.

Although the invention has been described with respect to preferred embodiments thereof, variations and modifications readily apparent to those skilled in the art can be carried out without departing from the spirit and scope of the invention.

For example, although the telephone set is connected to the line control part 4 in the above embodiments, the fax machine of the present invention may comprise an ear piece (e.g. speaker), mouth piece (e.g. microphone), and a telephone/fax number input part (e.g. buttons and touch panel) to have the functions of the telephone set.

It should be understood that the image transmission device of the present invention is not limited to the fax machines in the above embodiments, and is applicable to any device having a function of transmitting image data, including copy machines, network scanners, and multi-function digital equipment such as multi-function printers.

Processing for realizing the functions of the image transmission device in the above embodiments may be recorded as a program onto a recording medium so that a CPU of a computer constituting a system can execute the processing to realize the functions according to the program supplied by the recording medium.

In this case, the present invention is applicable even if information including the program is supplied to an output device from the recording medium or from an external recording medium through a network.

That is, program codes read from the recording medium themselves realize the novel functions of the present invention. Therefore, the recording medium having the program codes recorded thereon and signals read from the recording medium are included in the present invention.

The recording medium may include floppy disks, hard disks, optical disks, magneto optical disks, CD-ROM, CD-R, magnetic tapes, non-volatile memory cards, ROM, EEPROM, etc.

The program according to the present invention can cause a device controlled by the program to execute the functions of the image transmission device of the above embodiments of the present invention.

The present application is based on Japanese Priority Application No. 2004-126786 filed on Apr. 22, 2004, with the Japanese Patent Office, the entire contents of which are hereby incorporated by reference.

What is claimed is:

1. An image transmission device provided with a communication part capable of transmitting image data, comprising:
   a managing/storing part that registers and stores personal identification information together with a maintenance operator's right for performing maintenance work; and
   a control part that performs a control operation for forcibly terminating transmission after transmission of one page even if there are plural documents or limits transmission data to chart data for a communication test prestored in the image transmission device, when the image transmission device is used with the maintenance operator's right registered in the managing/storing part.

2. The image transmission device as claimed in claim 1, wherein the control part enables the predetermined minimum operations by limiting available operations and/or limiting items to be displayed, and
   the log containing predetermined contents includes any one or a combination of a log of performed operations, a log of transmitted contents, and a log of displayed items.

3. The image transmission device as claimed in claim 2, wherein the control part limits the available operations by any one or a combination of operations of preventing use of and reference to data registered in the device, restricting transmission of image data, preventing operations except minimum operations necessary for transmission, and limiting selectable transmission destinations.

4. The image transmission device as claimed in claim 3, further comprising:
   a reading part to read images of an original document;
   wherein the control part restricts the transmission of image data by permitting transmission of data of the images read by the reading part for only one time, or permitting transmission of only predetermined chart data for a communication test.

5. The image transmission device as claimed in claim 3, wherein the control part prevents the operations except minimum operations necessary for transmission by any one or a combination of operations of disabling redialing, preventing broadcast transmission, permitting transmission for only one time per line if plural lines are connected to the device, permitting transmission for only a predetermined number of times, and permitting only direct transmission.

6. The image transmission device as claimed in claim 2, wherein the control part limits the items to be displayed by hiding destinations registered in the device and/or hiding items used for redialing.

7. The image transmission device as claimed in claim 1,
   wherein the managing/storing part registers and stores personal identification information together with a manager's right, and
   when the image transmission device is used with the manager's right registered in the managing/storing part, the control part outputs the acquired log containing predetermined contents according to an input operation.

8. The image transmission device as claimed in claim 1,
   wherein the managing/storing part registers and stores personal identification information together with a manager's right, and
   when the image transmission device is used with the manager's right registered in the managing/storing part, the control part receives input that specifies operations available if the image transmission device is used with the maintenance operator's right.

9. The image transmission device as claimed in claim 1,
   wherein the maintenance operator's right registered in the managing/storing part is associated with one of levels each specifying the minimum operations to be enabled, and
   when the image transmission device is used with the maintenance operator's right registered in the managing/storing part, the control part changes available operations according to the level associated with the maintenance operator's right.

10. The image transmission device as claimed in claim 9, wherein the managing/storing part registers personal identification information together with a manager's right, and
    when the image transmission device is used with the manager's right registered in the managing/storing part, the control part receives input that specifies operations available for each of the levels of the maintenance operator's right.

11. An operations management method for use with an image transmission device, comprising:
    registering and storing personal identification information together with a maintenance operator's right for performing maintenance work in a storage device; and
    forcibly terminating transmission after transmission of one page even if there are plural documents or limiting transmission data to chart data for a communication test prestored in the image transmission device with a control device.

12. The operations management method as claimed in claim 11, further comprising:
    registering and storing personal identification information together with a manager's right; and
    outputting the acquired log containing predetermined contents according to an input operation performed with the manager's right registered in the manager registering step.

13. The operations management method as claimed in claim 11, further comprising:
    registering and storing personal identification information together with a manager's right; and
    receiving input performed with the manager's right, the input specifying operations available with the maintenance operator's right.

14. The operations management method as claimed in claim 11,
    wherein the maintenance operator's right is associated with one of levels each specifying the minimum operations to be enabled, and the method further comprises:
    changing available operations according to the level associated with the maintenance operator's right.

15. A computer-readable storage medium encoded with instructions which when executed by an image transmission device, causes the image transmission device to implement a method comprising:

registering and storing personal identification information together with a maintenance operator's right for performing maintenance work; and forcibly terminating transmission after transmission of one page even if there are plural documents or limiting transmission data to chart data for a communication test prestored in the image transmission device.

* * * * *